United States Patent
Tanogashira et al.

(10) Patent No.: US 10,231,583 B2
(45) Date of Patent: Mar. 19, 2019

(54) TOILET APPARATUS

(71) Applicant: TOTO LTD., Kitakyushu-shi, Fukuoka (JP)

(72) Inventors: Yuta Tanogashira, Kitakyushu (JP); Shoichi Tsuiki, Kitakyushu (JP); Takeshi Yasugata, Kitakyushu (JP); Kenichi Okamoto, Kitakyushu (JP)

(73) Assignee: TOTO LTD., Kitakyushu-Shi, Fukuoka (JP)

( * ) Notice: Subject to any disclaimer, the term of this patent is extended or adjusted under 35 U.S.C. 154(b) by 0 days.

(21) Appl. No.: 15/681,584

(22) Filed: Aug. 21, 2017

(65) Prior Publication Data

US 2018/0055296 A1    Mar. 1, 2018

(30) Foreign Application Priority Data

Aug. 23, 2016    (JP) ................. 2016-162439

(51) Int. Cl.

| | |
|---|---|
| *E03D 13/00* | (2006.01) |
| *A47K 13/10* | (2006.01) |
| *G01S 7/35* | (2006.01) |
| *G01S 13/34* | (2006.01) |
| *G01S 13/56* | (2006.01) |
| *E03D 9/08* | (2006.01) |
| *E03D 1/32* | (2006.01) |
| *E03D 3/00* | (2006.01) |
| *E03D 5/10* | (2006.01) |
| *A47K 13/24* | (2006.01) |

(52) U.S. Cl.
CPC ............. *A47K 13/105* (2013.01); *E03D 1/32* (2013.01); *E03D 3/00* (2013.01); *E03D 9/08* (2013.01); *G01S 7/352* (2013.01); *G01S 13/347* (2013.01); *G01S 13/56* (2013.01); *A47K 13/24* (2013.01); *E03D 5/105* (2013.01)

(58) Field of Classification Search
CPC ..................................................... A47K 13/105
USPC ............................................ 4/246.1, 234, 313
See application file for complete search history.

(56) References Cited

U.S. PATENT DOCUMENTS

| | | | | |
|---|---|---|---|---|
| 5,999,972 A | * | 12/1999 | Gish | .......... G06F 9/54 709/203 |
| 7,051,381 B2 | * | 5/2006 | Furukawa | .............. A47K 13/10 4/246.1 |
| 8,082,607 B2 | * | 12/2011 | Matsushita | ............ A47K 13/24 4/302 |
| 2015/0159356 A1 | * | 6/2015 | Fukuya | ..................... E03D 5/01 4/329 |

(Continued)

FOREIGN PATENT DOCUMENTS

| | | |
|---|---|---|
| JP | 2004-194999 A | 7/2004 |
| JP | 4411973 B2 | 2/2010 |
| TW | 200745422 A | 12/2007 |

*Primary Examiner* — Huyen Le
(74) *Attorney, Agent, or Firm* — Pearne & Gordon LLP

(57) ABSTRACT

A toilet apparatus according to an embodiment includes a toilet seat, a main part, a toilet, a tank, and a radio wave sensor. The toilet seat is pivotally supported by the main part to be openable and closable. The toilet is provided under the main part. The main part is placed on the toilet. The tank is provided inside the toilet. Water for washing the toilet is stored in the tank. The radio wave sensor is disposed higher than the tank. The radio wave sensor detects a human body by radiating a radio wave frontward of the main part.

3 Claims, 4 Drawing Sheets

(56) References Cited

U.S. PATENT DOCUMENTS

2017/0258281 A1\* 9/2017 Zhao ..................... A47K 13/10

\* cited by examiner

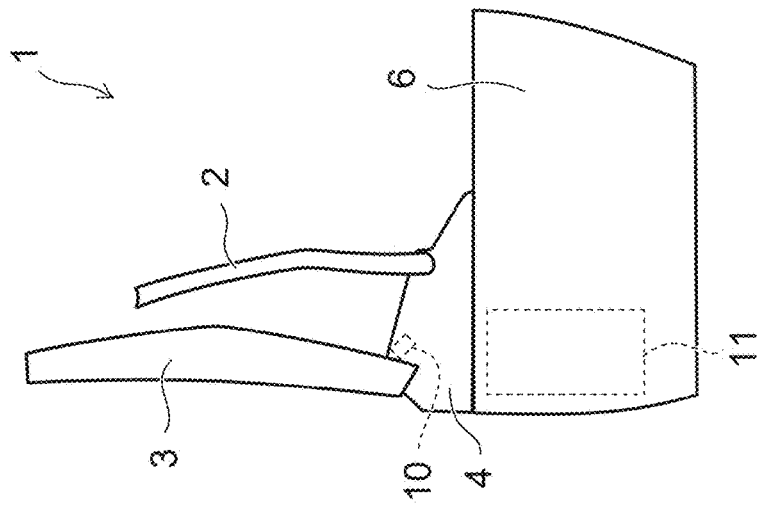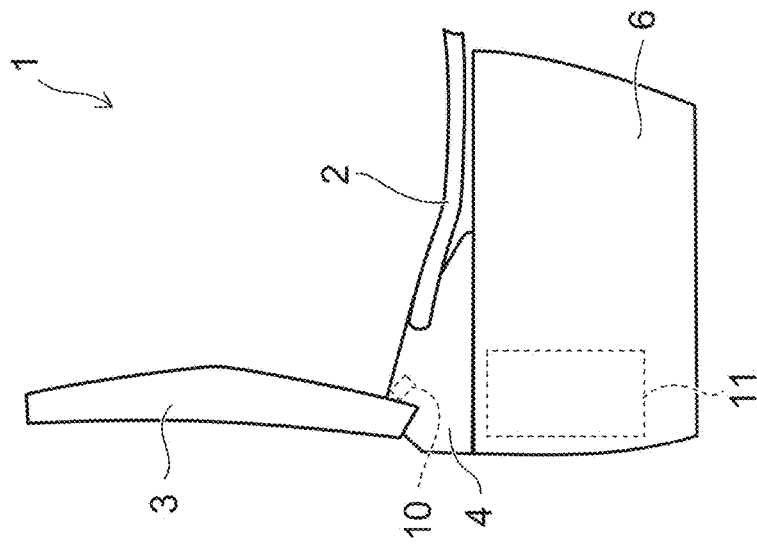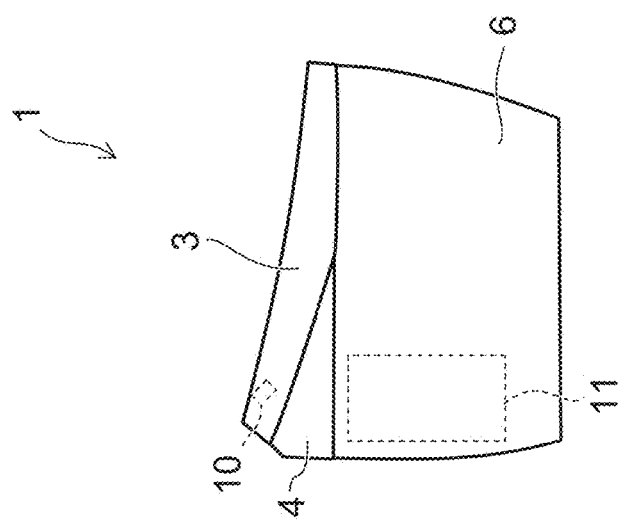

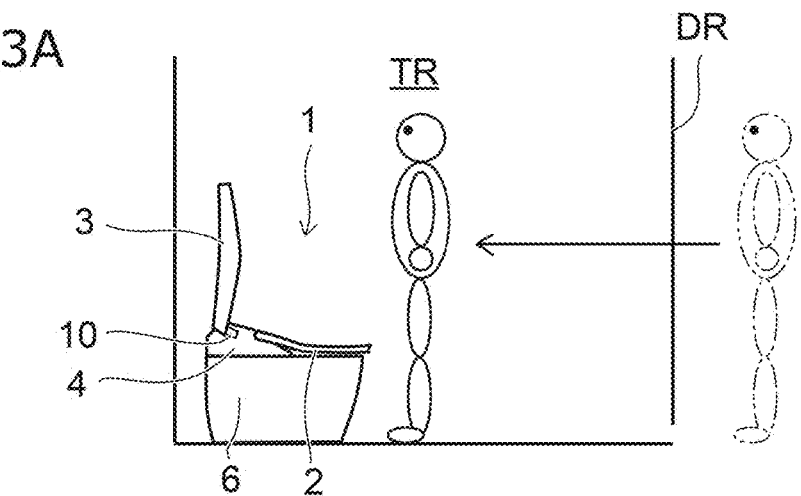
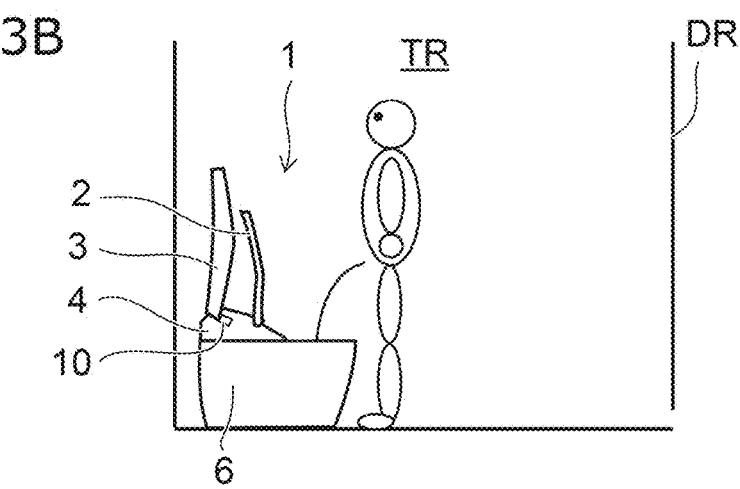
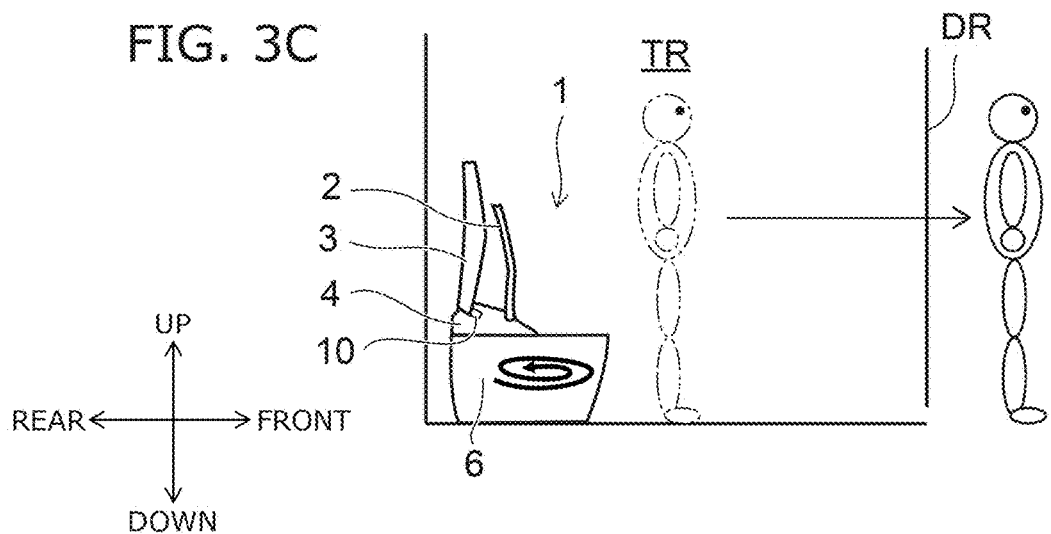

TOILET APPARATUS

CROSS-REFERENCE TO RELATED APPLICATIONS

This application is based upon and claims the benefit of priority from Japanese Patent Application No. 2016-162439, filed on Aug. 23, 2016; the entire contents of which are incorporated herein by reference.

FIELD

Embodiments described herein relate generally to a toilet apparatus.

BACKGROUND

A toilet seat apparatus includes a human body detector, a toilet seat, and a metal member. The human body detector detects a user entering and/or exiting a toilet room by using a radio wave. The metal member is provided in the toilet seat interior to warm the toilet seat. According to the arrangement position of the human body detector in such a toilet seat apparatus, the radio wave is reflected by the metal member of the toilet seat interior; and there is a possibility that the detection precision of the human body detector may decrease.

In JP-A 2004-194999 (Kokai), the human body detector is disposed inside a region where the opening of the toilet seat is projected rearward in the state in which the toilet seat is open. Thereby, the effects due to the metal member of the toilet seat interior are avoided. Specifically, the toilet apparatus is mounted to low tank equipment at the upper surface of the rear part of the toilet. The human body detector is disposed inside a region where the opening of the toilet seat when upright along the low tank equipment is projected rearward.

However, in the toilet seat apparatus discussed in JP-A 2004-194999 (Kokai), because the human body detector is disposed at the low tank equipment, the front of the human body detector is covered with the toilet lid when the toilet lid is open. Therefore, part of the radio wave radiated from the human body detector is reflected rearward by the toilet lid in the open state. As a result, there is a possibility that the movement of the water inside the wash tank, etc., may be misdetected by the human body detector as movement of the human body.

The invention is based on the recognition of such problems and is directed to provide a toilet apparatus in which it is possible to increase the detection precision of the human body.

SUMMARY

A toilet apparatus according to an embodiment includes a toilet seat, a main part, a toilet, a tank, and a radio wave sensor. The toilet seat is pivotally supported by the main part to be openable and closable. The toilet is provided under the main part. The main part is placed on the toilet. The tank is provided inside the toilet. Water for washing the toilet is stored in the tank. The radio wave sensor is disposed higher than the tank. The radio wave sensor detects a human body by radiating a radio wave frontward of the main part.

BRIEF DESCRIPTION OF THE DRAWINGS

FIGS. 1A to 1C are side views of a toilet apparatus according to an embodiment;

FIGS. 3A to 3C are side views illustrating the operation of the toilet apparatus according to the embodiment.

DETAILED DESCRIPTION

Figure 2A:
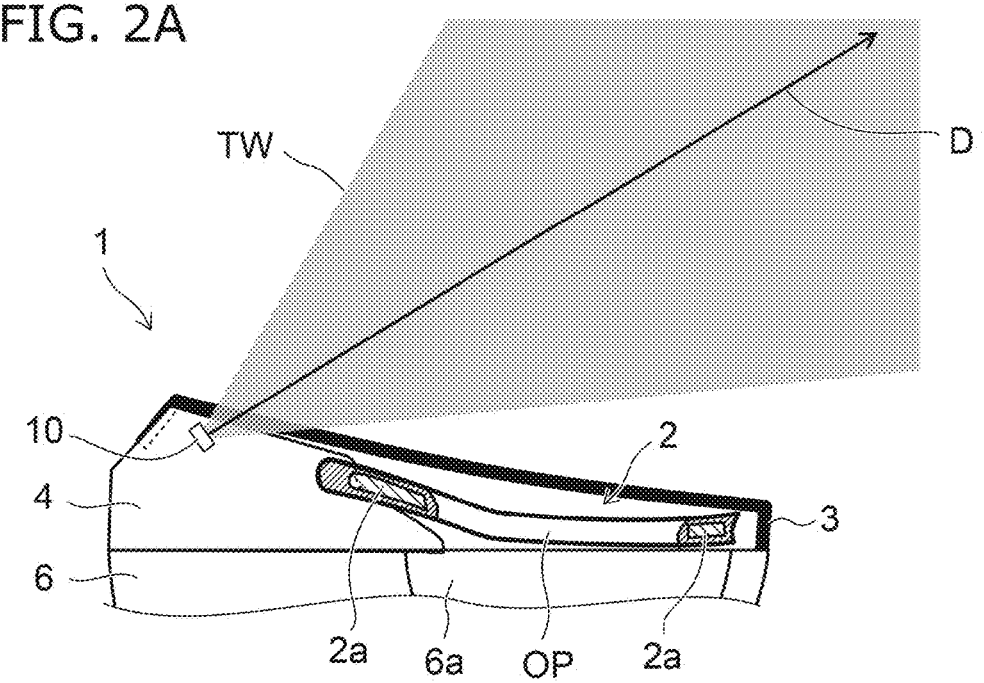
FIGS. 2A and 2B are cross-sectional views illustrating a part of the toilet apparatus according to the embodiment.

A toilet apparatus of a first invention includes a toilet seat, a main part, a toilet, a tank, and a radio wave sensor. The toilet seat is pivotally supported by the main part to be openable and closable. The toilet is provided under the main part. The main part is placed on the toilet. The tank is provided inside the toilet. Water for washing the toilet is stored in the tank. The radio wave sensor is disposed higher than the tank. The radio wave sensor detects a human body by radiating a radio wave frontward of the main part.

According to the toilet apparatus, the movement of the water inside the tank is not detected easily by the radio wave sensor even when the radio wave radiated from the radio wave sensor is reflected toward the rear. Therefore, it is possible to reduce the likelihood of misdetections by the radio wave sensor and increase the detection precision by the radio wave sensor.

In a second invention, a toilet lid is further included in the first invention. The toilet lid is pivotally supported by the main part. The toilet lid is positioned rearward of the radio wave sensor in a state in which the toilet lid is open. The toilet lid is positioned frontward of the radio wave sensor in a state in which the toilet lid is closed.

According to the toilet apparatus, the reflection of the radio wave by the toilet lid is reduced in the state in which the toilet lid is open. Therefore, it is possible to detect the movement of the user of the toilet apparatus with higher precision.

A third invention is the toilet apparatus of the first or second invention in which a position in a left/right direction of the radio wave sensor is different from a position in the left/right direction of the tank.

According to the toilet apparatus, the movement of the water inside the tank is detected even less easily by the radio wave sensor; and it is possible to further increase the detection precision by the radio wave sensor.

A fourth invention is the toilet apparatus of any one of the first to third inventions in which a maximum directivity direction of the radio wave radiated from the radio wave sensor passes through an opening of the toilet seat in the state in which the toilet seat is open.

According to the toilet apparatus, the reflection of the radio wave by the metal member inside the toilet seat when the toilet seat is open is suppressed; and it is possible to detect the movement of the user of the toilet apparatus with higher precision.

Embodiments of the invention will now be described with reference to the drawings. Similar components in the drawings are marked with the same reference numerals; and a detailed description is omitted as appropriate.

FIGS. 1A to 1C are side views of the toilet apparatus according to the embodiment.

The toilet apparatus 1 illustrated in FIGS. 1A to 1C includes a toilet seat 2, a toilet lid 3, a main part 4, and a western-style sit-down toilet (hereinbelow, called simply the "toilet") 6. The main part 4 is placed on the toilet 6. The toilet seat 2 and the toilet lid 3 each are pivotally supported openably and closeably by the main part 4.

FIG. 1A illustrates a state in which the toilet seat 2 and the toilet lid 3 are closed (lowered). FIG. 1B illustrates a state in which the toilet seat 2 is closed and the toilet lid 3 is open. FIG. 1C illustrates a state in which the toilet seat 2 and the toilet lid 3 are open (raised).

"Up," "down," "front," "rear," "left," and "right" are used in the description of the embodiments recited below. These directions are as viewed by a user seated on the toilet seat 2.

A tank 11 is built into the toilet 6 at the rear of the toilet 6. Service water or the like is supplied to and stored by the tank 11. The toilet apparatus 1 includes a booster pump and/or a water supply pipe connected to the tank 11. The water that is stored in the tank 11 is forced by the booster pump through the water supply pipe into the bowl of the toilet 6. Thereby, the interior of the bowl is washed. On the other hand, the toilet apparatus 1 also may be configured so that a direct water supply is possible in which service water is supplied directly to the interior of the toilet 6. To this end, the toilet apparatus 1 includes a valve unit, a water supply path switch valve, etc. The valve unit receives the supply of service water. The water supply path switch valve switches between the water supply path to the bowl and the water supply path to the tank 11.

A private part washing function part that washes the "bottom" of the user seated on the toilet seat 2 and the like are built into the interior of the main part 4. A radio wave sensor 10 is provided in the interior of the main part 4. The radio wave sensor 10 is disposed higher than the tank 11. The radio wave sensor 10 is a doppler sensor that utilizes the doppler effect. The radio wave sensor 10 radiates a high frequency wave radio wave such as a microwave, a millimeter wave, etc., and receives the reflected wave from the detection object of the radiated radio wave. Information that relates to the state of the detection object is included in the reflected wave. The entrance of the user into the toilet room and/or the movement of the user in front of the toilet seat are detected based on the radiated radio wave and the reflected wave.

The radio wave sensor 10 outputs the detection result to a controller such as a microcomputer, etc. The controller receives the detection result and performs the opening of the toilet lid 3, the washing of the toilet 6 using the tank 11 and the like, the heating of the toilet seat 2, etc.

Figure 2B:
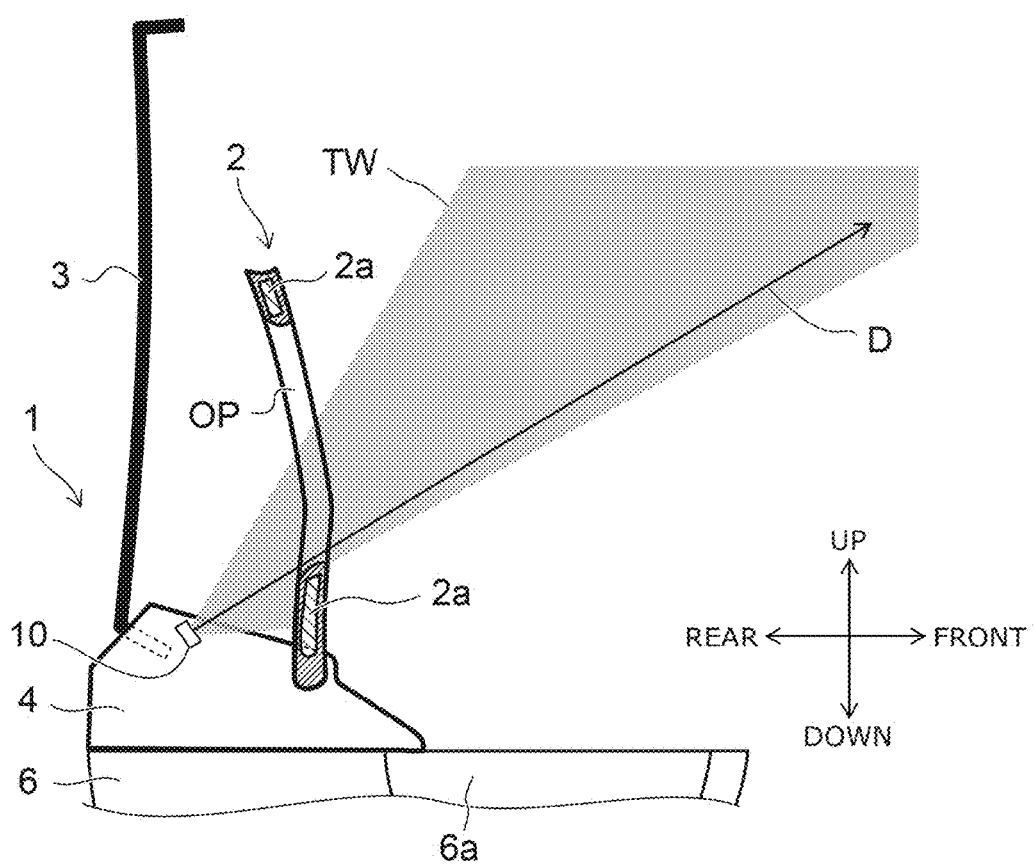

FIGS. 2A and 2B are cross-sectional views illustrating a part of the toilet apparatus according to the embodiment.

FIG. 2A illustrates the state in which the toilet seat 2 and the toilet lid 3 are closed. FIG. 2B illustrates the state in which the toilet seat 2 and the toilet lid 3 are open.

As illustrated in FIG. 2A and FIG. 2B, a metal member 2a is provided as a heating element in the interior of the toilet seat 2 to warm the seating surface. For example, the metal member 2a is provided around an opening OP of the toilet seat 2. When the user is seated on the toilet seat 2, the toilet seat 2 is warmed by a current provided to the metal member 2a. For example, a tubing heater, a sheathed heater, a halogen heater, a carbon heater, or the like is used as the heater provided in the toilet seat 2. The metal member 2a includes, for example, aluminum, copper, etc. Various configurations such as a sheet configuration, a wire configuration, a mesh configuration, etc., may be employed as the configuration of the metal member 2a.

The toilet seat 2, the toilet lid 3, and the case of the main part 4 include a material such as a resin, etc., that easily transmits the radio wave. On the other hand, the metal member 2a reflects the radio wave without transmitting. A maximum directivity direction D of a radio wave TW radiated from the radio wave sensor 10 is tilted upward with respect to the horizontal direction. The maximum directivity direction of the radio wave means the direction of the maximum value of the intensity distribution of the radiated radio wave. In the case where the radio wave is radiated from the radio wave sensor 10 to have maximum values in multiple directions, it is sufficient for at least one of the directions to be tilted upward with respect to the horizontal direction.

As illustrated in FIG. 2A, the maximum directivity direction D passes above the toilet seat 2 in the state in which the toilet seat 2 and the toilet lid 3 are closed. As illustrated in FIG. 2B, the maximum directivity direction D passes through the opening OP of the toilet seat 2 in the state in which the toilet seat 2 is open. Although FIG. 2B illustrates the case where the maximum directivity direction D passes through the lower end vicinity of the opening OP, the tilt and the like are modifiable as appropriate as long as the maximum directivity direction D passes through the opening OP.

An example of the operation of the toilet apparatus will now be described with reference to FIGS. 3A to 3C.

FIGS. 3A to 3C are side views illustrating the operation of the toilet apparatus according to the embodiment.

For example, the toilet seat 2 and the toilet lid 3 are closed before the user enters a toilet room TR. The user is detected entering the toilet room TR by the radio wave sensor 10. Thereby, the toilet lid 3 is opened as illustrated in FIG. 3A. Subsequently, the user uses the toilet apparatus 1 as illustrated in FIG. 3B and moves away from the toilet apparatus 1 toward a door DR as illustrated in FIG. 3C. When the radio wave sensor 10 detects such movement, the washing of the interior of the toilet 6 is performed. After the washing of the toilet 6, the toilet apparatus 1 may further close the toilet seat 2 and the toilet lid 3.

Here, a case is described where the user performs standing urination. This is similar for the case where defecation is performed while seated on the toilet seat 2. In other words, after using the toilet apparatus 1, the user is detected by the radio wave sensor 10 to have moved away from the toilet apparatus 1. Then, the toilet apparatus 1 washes the toilet 6 and closes the toilet lid 3.

In the embodiment, the radio wave sensor 10 is disposed higher than the tank 11 for washing the interior of the toilet 6. According to such a configuration, the movement of the water inside the tank 11 is not detected easily by the radio wave sensor 10 even in the case where the radio wave radiated from the radio wave sensor 10 is reflected toward the rear by the toilet lid 3, the case of the main part 4, etc. Therefore, it is possible to reduce the likelihood of misdetections by the radio wave sensor 10 and increase the detection precision of the radio wave sensor 10.

It is also desirable to be able to detect the movement of the user with higher precision while the toilet apparatus 1 is being used with the toilet seat 2 and/or the toilet lid 3 open. This is because if the user is erroneously detected to have finished using the toilet apparatus 1 while the user is still using the toilet apparatus 1, the washing of the toilet 6 may be performed or the toilet seat 2 and/or the toilet lid 3 may be closed even though the toilet apparatus 1 is being used.

On this point, in the toilet apparatus 1 according to the embodiment, the toilet lid 3 is positioned frontward of the radio wave sensor 10 when the toilet lid 3 is in the closed state. However, the toilet lid 3 is positioned rearward of the radio wave sensor 10 when the toilet lid 3 is in the open state. The reflection of the radio wave by the toilet lid 3 is reduced by the toilet lid 3 being positioned rearward of the radio wave sensor 10 when the toilet lid 3 is in the open state. As a result, it is possible to detect the movement of the user inside the toilet room with higher precision.

In the toilet apparatus 1 according to the embodiment, when the toilet seat 2 is in the open state, the maximum directivity direction D of the radio wave TW radiated from the radio wave sensor 10 passes through the opening OP of the toilet seat 2 as illustrated in FIG. 2B. Therefore, when the toilet seat 2 is in the open state, the reflection of the radio wave TW by the metal member 2a of the toilet seat 2 interior is reduced. As a result, it is possible to detect the movement of the user inside the toilet room with higher precision.

Figure 4:
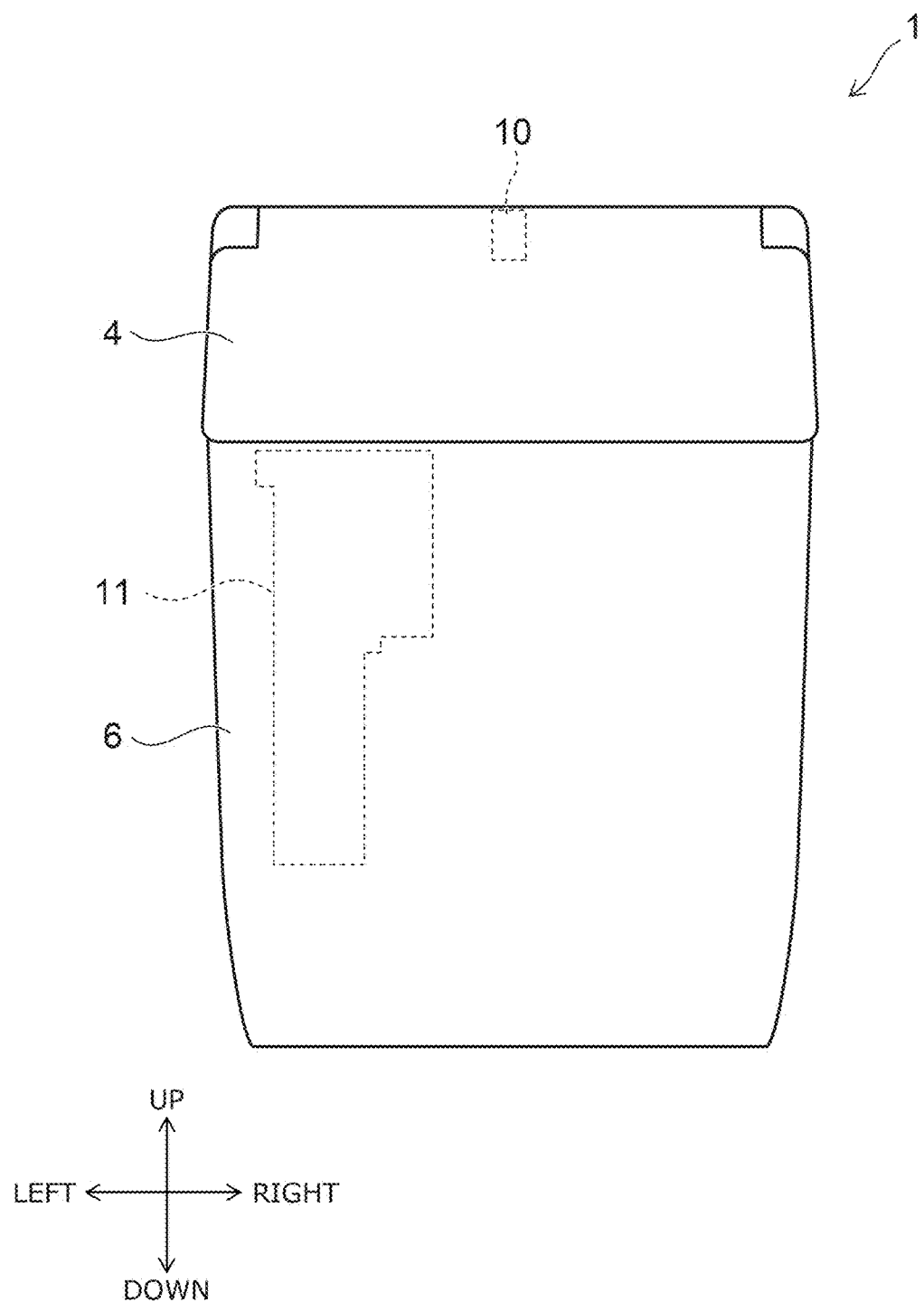
FIG. 4 is a rear view of the toilet apparatus according to the embodiment.

FIG. 4 is a rear view of the toilet apparatus according to the embodiment.

In the toilet apparatus 1 as illustrated in FIG. 4, the tank 11 that is provided at the rear of the toilet 6 and the radio wave sensor 10 that is provided inside the main part 4 are not aligned in the vertical direction. The tank 11 and the radio wave sensor 10 are arranged to be shifted in the left/right direction. In other words, the position in the left/right direction of the tank 11 and the position in the left/right direction of the radio wave sensor 10 are different from each other. By such an arrangement, the movement of the water inside the tank 11 is detected even less easily when part of the radio wave radiated from the radio wave sensor 10 is reflected by the toilet lid 3 and/or the case of the main part 4. Accordingly, it is possible to increase the detection precision of the radio wave sensor 10 even more.

The embodiments of the invention have been described above. However, the invention is not limited to the above description. Those skilled in the art can appropriately modify the design of the above embodiments. Such modifications are also encompassed within the scope of the invention as long as they include the features of the invention. For instance, the shape, dimension, material, layout, and placement of each element such as the toilet apparatus 1 are not limited to those illustrated, but can be suitably modified.

Furthermore, the elements of the above embodiments can be combined with each other as long as technically feasible. Such combinations are also encompassed within the scope of the invention as long as they include the features of the invention.

What is claimed is:

1. A toilet apparatus, comprising:
   a toilet seat;
   a main part, the toilet seat being pivotally supported by the main part to be openable and closable;
   a toilet provided under the main part, the main part being placed on the toilet;
   a tank provided inside the toilet, the tank being able to store water for washing the toilet; and
   a radio wave sensor disposed higher than the tank, the radio wave sensor detecting a human body by radiating a radio wave frontward of the main part,
   wherein at least a part of the tank is positioned rearward of the radio wave sensor, and
   a position in a left/right direction of the radio wave sensor is different from a position in the left/right direction of the tank.

2. The apparatus according to claim 1, further comprising a toilet lid pivotally supported by the main part,
   the toilet lid being positioned rearward of the radio wave sensor in a state in which the toilet lid is open,
   the toilet lid being positioned frontward of the radio wave sensor in a state in which the toilet lid is closed.

3. The apparatus according to claim 1, wherein a maximum directivity direction of the radio wave radiated from the radio wave sensor passes through an opening of the toilet seat in a state in which the toilet seat is open.

* * * * *